United States Patent [19]

Martinez

[11] Patent Number: 4,747,258
[45] Date of Patent: May 31, 1988

[54] MOWER UNIT BASKET LATCH

[76] Inventor: Donald G. Martinez, P.O. Box 584, Calistoga, Calif. 94515

[21] Appl. No.: 947,733

[22] Filed: Dec. 30, 1986

[51] Int. Cl.$^4$ .............................................. A01D 34/48
[52] U.S. Cl. .......................................... 56/199; 56/202
[58] Field of Search ............... 56/202, 16.6, 7, 198, 56/199, 249; 24/644

[56] References Cited

U.S. PATENT DOCUMENTS

| 854,196 | 5/1907 | Brown | 24/644 |
|---|---|---|---|
| 930,058 | 12/1910 | Ertl | 56/202 |
| 1,798,021 | 8/1928 | Jerram | 56/202 |
| 1,881,618 | 7/1932 | Jacobsen | 56/202 |
| 2,191,601 | 2/1940 | Wesscock | 56/199 |
| 2,882,668 | 4/1959 | Murillo | 56/202 |
| 3,100,372 | 8/1963 | Barth | 56/202 |
| 3,108,420 | 9/1963 | Gercke | 56/202 |
| 3,110,147 | 12/1963 | Barth | 56/199 |
| 3,493,987 | 2/1970 | Longnecker | 56/16.6 |
| 3,691,740 | 8/1972 | Weber | 56/198 |
| 3,757,503 | 9/1973 | Soldavini | 56/202 |
| 3,797,578 | 3/1974 | Velasquez | 172/22 |
| 4,080,774 | 3/1978 | Knight | 56/199 |
| 4,149,363 | 4/1979 | Woelffer et al. | 56/202 |
| 4,589,251 | 5/1986 | Amano et al. | 56/202 |

FOREIGN PATENT DOCUMENTS

| 213683 | 7/1956 | Australia | 56/16.6 |
|---|---|---|---|
| 683461 | 3/1964 | Canada | 56/16.6 |
| 270787 | 5/1927 | United Kingdom | 56/199 |
| 423753 | 2/1935 | United Kingdom | 56/7 |

Primary Examiner—John Weiss
Attorney, Agent, or Firm—Townsend and Townsend

[57] ABSTRACT

The basket latch is used to keep the basket hooks of a catch basket secured to a transversely extending hollow support bar on a mower unit. The basket latch includes a center rod sized to pass through the hollow support bar and extend a small distance from each end. A keeper assembly is mounted to each end of the center rod. Each keeper assembly has an L-shaped member with arms extending radially from the center rod. One arm has an axially extending latch pin secured to its outer end. The latch pin extends parallel to and is spaced apart from the center rod at a distance sufficient to allow the basket hook to be positioned between the latch pin and support bar. The other arm acts as a counterweight to bias the latch pin downwardly against the basket hook thus trapping the basket hook against the support bar. When the basket hook has a J-shape, its recurved tip portion is removed to create an L-shaped hook; this aids mounting and dismounting of the basket hook to and from the support bar even when the hook becomes bent during use.

13 Claims, 2 Drawing Sheets

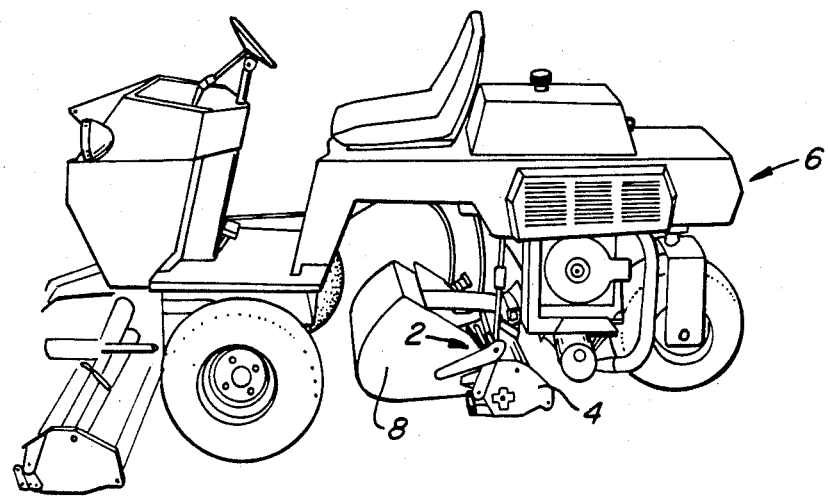
FIG._1.
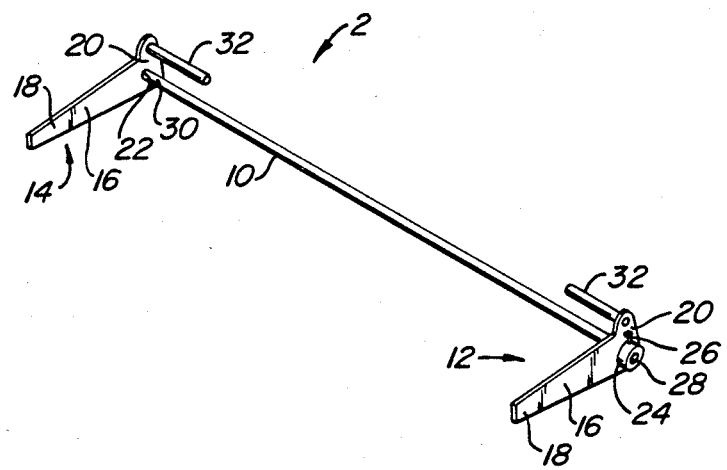
FIG._2.

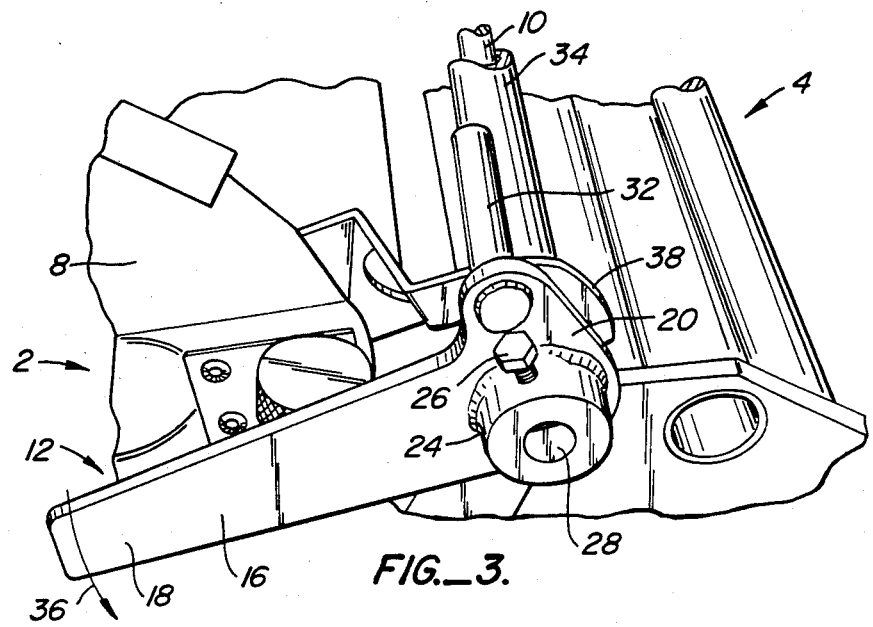
FIG._3.
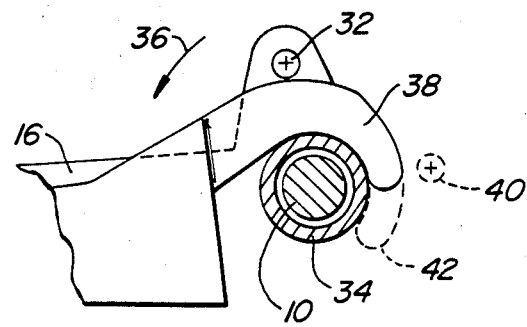
FIG._4.
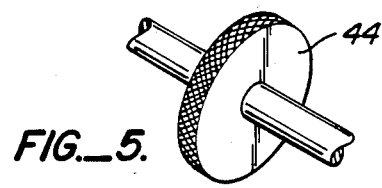
FIG._5.

4,747,258

MOWER UNIT BASKET LATCH

BACKGROUND OF THE INVENTION

Mower units for cutting turf, such as golf course fairways and putting greens, often use catch baskets to gather the clippings. One type of catch basket is secured to a mower unit in part by the engagement of downwardly opening, J-shaped basket hooks onto a transversely extending hollow support bar on the mower unit. Although the J-shaped basket hooks work well when in good condition, during use the hooks invariably become bent, deformed or otherwise damaged. Consequently, the catch baskets become difficult to get on and off the mower unit after they have been in use for a period of time.

SUMMARY OF THE INVENTION

The present invention is directed to a mower unit basket latch, particularly useful as a kit, which secures the basket hooks of a catch basket to the support bar on a mower unit while allowing the user to easily and quickly mount the catch basket onto and remove the catch basket from the mower unit even when the basket hooks have become damaged during use.

The basket latch, in the preferred embodiment, includes a center rod sized to pass through the hollow support bar and to extend a small distance from each end. A keeper assembly is mounted to each end of the center rod. Each keeper assembly has an L-shaped member with radially extending arms. One arm has an axially extending latch pin secured to its outer end. The latch pin extends parallel to and spaced apart from the center rod at a distance sufficient to allow the basket hook to be positioned between the latch pin and the support bar. The other arm acts as a counterweight to bias the latch pin downwardly against the basket hook when the basket latch is in the latched position thus trapping the basket hook against the support bar.

The basket hooks used with conventional catch baskets often are J-shaped with an upper horizontal portion, a generally vertical portion and a recurved tip portion. The use of the basket latch eliminates the need for the recurved portions. Therefore, any recurved portions are removed to aid mounting and dismounting of the basket hooks to and from the support bar even when the basket hooks are deformed.

The basket latch is particularly suited for use as an aftermarket or retrofit item. It is inexpensive to produce, simple to use and sturdy. It extends laterally from the support bar only a short distance so not to limit mobility of the cutting unit. Any modifications to the catch basket hooks to remove the recurved portions can be easily and quickly done.

Other features and advantages of the present invention will appear from the following description in which the preferred embodiment has been set forth in detail in conjunction with the accompanying drawings.

BRIEF DESCRIPTION OF THE DRAWINGS

FIG. 1 shows the mower unit basket latch mounted to a mower unit on a triplex mower.

FIG. 2 is an isometric view of the basket latch of FIG. 1.

FIG. 3 is an enlarged perspective view showing a keeper assembly at one end of the basket latch of FIG. 1 in a latched position.

FIG. 4 is a simplified cross-sectional view of the basket latch of FIG. 1 showing the keeper assembly in a latched position in solid lines and an unlatched position in dashed lines and illustrating, in dashed lines, the recurved portion of the basket hook which has been removed in accordance with the invention.

FIG. 5 is a simplified representation of a grinding wheel used to remove the basket hook recurved portion of FIG. 4.

DETAILED DESCRIPTION OF THE PREFERRED EMBODIMENT

Referring now to FIGS. 1 and 2, a basket latch 2 is shown mounted to the mower unit 4 of a triplex mower 6 to secure a catch basket 8 to the mower unit. The triplex mower 4 and catch basket 8 are commercially available products, such as made by Jacobsen of Racine, Wis.

Basket latch 2 includes broadly a center rod 10 and a pair of keeper assemblies 12, 14. Each keeper assembly 12, 14 includes an L-shaped member 16 having first and second arms 18, 20. L-shaped members 16 include bores 22 through which center rod 10 passes. Keeper assembly 12 has a collar 24 welded to L-shaped member 16 and aligned with bore 22. A set screw 26 in collar 24 allows the user to secure keeper assembly 12 to an end 28 of center rod 10 when desired. The other end 30 of center rod 10 is secured to L-shaped member 16 of keeper assembly 14 by welding. If desired keeper assembly 14 can be secured to rod 10 in the same manner as is keeper assembly 12. Latch pins 32 are secured to and extend from the distal ends 34 of second arms 20 toward one another in directions generally parallel to but spaced apart from center rod 10 (see FIG. 3).

Referring now also to FIGS. 3 and 4, basket latch 2 is mounted to mower unit 4 by passing center rod 10 (with keeper assembly 12 removed) through a hollow support bar 34, support bar 34 being a part of mower unit 4. Keeper assembly 12 is then mounted to end 28 of center rod 10 with latch pins 32 generally aligned. Keeper assemblies 12, 14 are moved in unison, since they are both rigidly secured to center rod 10, from a latched position of FIGS. 1 and 3, and shown in solid lines in FIG. 4, to an unlatched position, illustrated in dashed lines in FIG. 4. First arm 18 acts as a counterweight to bias latch pins 32 in the direction of arrow 36 when in the latched position so to press basket hooks 38, mounted to and extending from catch basket 8, against support bar 34. The angle between arms 18, 20 is about 90°. When keeper assemblies 12, 14 are in their latched positions, arms 18 are somewhat below horizontal so that a force must be applied to at least one of arms 18 to pivot keeper assemblies 12, 14 in the direction opposite arrow 36 until arms 18 are near vertical and arms 20 are about horizontal. When keeper assemblies 12, 14 are in the unlatched (dashed line) positions 40 of FIG. 4, basket hooks 38 are free to be removed from support bar 34.

As shown in FIG. 4, the recurved portions 42 of basket hooks 38 have been removed, such as with grinding wheel 44 shown in FIG. 5. Doing so eliminates most of the problems caused when basket hooks 38 are bent or otherwise deformed during use. Latch pins 32 extend sufficient distances so to keep hooks 38 mounted over support bar 34 even when hooks are quite deformed.

To install basket latch 2 on mower unit 4, the user removes keeper assembly 12 from center rod 10 by loosening set screw 26. End 28 of center rod 10 is then inserted into and through one end of hollow support bar 34 until end 28 extends from the other end of bar 34. Keeper assembly 12 is then mounted to end 28 of center rod 10 with latch pins 32 aligned and secured in place using set screw 26. Basket latch 32 is then pivoted in the direction opposite arrow 36 to unlatched position 40. Basket hooks 38, which have had recurved portions 42 removed, are then mounted over support bar 34. Basket latch 2 is then pivoted in the direction of arrow 36 to place it in the latched position with latch pins 32 pressing basket hooks 38 against support bar 34 under the influence of the weight of first arms 18 acting as counterweights.

Modification and variation can be made to the disclosed embodiments without departing from the subject of the invention as defined by the following claims. For example, other arrangements for mounting keeper assemblies 12, 14 to mower unit 4 could be used instead of passing center rod 10 through support bar 34. Other means for biasing latch pin 32 against basket hooks 38 can be used instead of the counterweight method of the preferred embodiment.

What is claimed is:

1. A method for securing at least one catch basket hook of a catch basket to a mower unit, the catch basket hook of the type having a downwardly facing opening for engaging a support element on the mower unit, the method comprising:
   securing a keeper assembly to the mower unit adjacent the support element, the keeper assembly generally movable between latched and unlatched positions;
   positioning the keeper assembly in the unlatched position to permit access to the support element by the basket hook;
   placing the at least one basket hook over the support element;
   moving the keeper assembly from the unlatched position to the latched position at which the hook is captured between the keeper assembly and the support element; and
   maintaining the keeper assembly in the latched position by rotationally biasing the keeper assembly around the supporting element and towards the basket hook.

2. A method for securing at least one catch basket hook of a catch basket to a mower unit, the catch basket hook of the type having a downwardly facing opening for engaging a support bar on the mower unit, the support bar having first and second ends, the method comprising:
   securing a keeper assembly to the first end of the support bar, the keeper assembly having a latch pin extending generally parallel to and spaced apart from the support bar and movable between latched and unlatched positions;
   positioning the latch pin in the unlatched position with the latch positioned laterally offset from the support bar to permit vertical access to the support bar by the basket hook;
   placing the at least one basket hook over the support bar at the first end of the support bar;
   moving the latch pin from the unlatched position to the latched position at which the hook is captured between the latch pin and the support bar; and
   maintaining the latch pin in the latched position by rotationally biasing the latch pin around the support bar and toward the basket hook.

3. The method of claim 2 further comprising a second keeper assembly secured to the second end of the support bar.

4. The method of claim 2 wherein the rotationally biasing step is carried out using a weighted keeper arm which extends generally radially outwardly from the support bar when the keeper assembly is in the latched position so to maintain the latch pin in the latched position.

5. The method of claim 2 further comprising the step of substantially removing any recurved portion of the at least one basket hook prior to the placing step.

6. A method for securing at least one catch basket hook of a catch basket to a mower unit, the catch basket hook of the type having a downwardly facing opening for engaging a hollow support bar on the mower unit, the support bar having first and second ends, the method comprising:
   securing a keeper assembly to the first end of the support bar, the keeper assembly having a latch pin extending generally parallel to and spaced apart from the support bar and movable between latched and unlatched positions;
   the securing step including the steps of:
      mounting a center rod, having first and second ends, through the support bar; and
      securing the keeper assembly to the first end of the center rod adjacent the first end of the support bar;
   positioning the latch pin in the unlatched position with the latch pin positioned laterally offset from the support bar to permit vertical access to the support bar by the basket hook;
   placing the at least one basket hook over the support bar at the first end of the support bar;
   moving the latch pin from the unlatched position to the latched position at which the hook is captured between the latch pin and the support bar; and
   maintaining the latch pin in the latched position.

7. The method of claim 6 wherein the center rod has a second keeper assembly secured to its second end.

8. The method of claim 7 wherein the securing step includes the step of rigidly fixing the keeper assemblies to the center rod so that the keeper assemblies move in unison between the latched and unlatched positions.

9. A combination catch basket and mower unit comprising:
   a mower unit having a laterally extending hollow support bar;
   a catch basket having a basket hook for mounting to the hollow support bar on the mower unit, the basket hook having a generally horizontal portion and a generally vertical portion extending downwardly from the horizontal portion, the basket hook engaging the support bar at the intersection of the generally horizontal and vertical portions;
   a center rod sized to fit within the hollow support bar;
   keeper assemblies; and
   means for rigidly securing a keeper assembly to each end of the center rod, each keeper assembly including:
      a latch pin extending parallel to and spaced apart from the center rod; and
      a weighted keeper arm extending generally radially outwardly from the center rod, the latch pin and keeper arm oriented generally 90° from one another so the keeper arm biases the latch pin against the basket hook horizontal portion when the keeper arm is generally horizontal so to secure the hook to the mower unit.

10. A catch basket latch kit, for use with catch baskets of the type having a basket hook sized to engage a support element on a mower unit, the kit comprising:

a keeper assembly;

means for securing the keeper assembly to the mower unit adjacent the support element; and the keeper assembly including a latch pin extending generally parallel to and spaced apart from the support element and means for rotationally biasing the latch pin around the support element and against the basket hook so to press the basket hook against the support element so to keep the basket hook engaged with the support element.

11. The kit of claim 10 further comprising metal removing means for removing any recurved portions of the basket hook so the hook engage and disengage the support bar through vertical movement.

12. The kit of claim 10 wherein the biasing means includes a weighted lever arm.

13. The kit of claim 10 wherein the support element includes a hollow tube and the securing means includes a rod sized to pass through the hollow tube and to which first and second of the keeper assemblies are secured at each end.

* * * * *